United States Patent
Tsunoda et al.

(10) Patent No.: US 11,222,552 B2
(45) Date of Patent: Jan. 11, 2022

(54) DRIVING TEACHING DEVICE

(71) Applicant: DENSO CORPORATION, Kariya (JP)

(72) Inventors: Ayako Tsunoda, Kariya (JP); Hiroshi Morimoto, Kariya (JP); Kaneyoshi Ueda, Kariya (JP)

(73) Assignee: DENSO CORPORATION, Kariya (JP)

( * ) Notice: Subject to any disclaimer, the term of this patent is extended or adjusted under 35 U.S.C. 154(b) by 753 days.

(21) Appl. No.: 16/076,021

(22) PCT Filed: Jan. 24, 2017

(86) PCT No.: PCT/JP2017/002205
§ 371 (c)(1),
(2) Date: Aug. 7, 2018

(87) PCT Pub. No.: WO2017/138343
PCT Pub. Date: Aug. 17, 2017

(65) Prior Publication Data
US 2021/0192974 A1   Jun. 24, 2021

(30) Foreign Application Priority Data
Feb. 9, 2016   (JP) .............................. JP2016-023029

(51) Int. Cl.
*G09B 19/16* (2006.01)
*B60W 40/09* (2012.01)
(Continued)

(52) U.S. Cl.
CPC .......... *G09B 19/167* (2013.01); *B60W 40/09* (2013.01); *B60W 50/14* (2013.01);
(Continued)

(58) Field of Classification Search
None
See application file for complete search history.

(56) References Cited

U.S. PATENT DOCUMENTS

2015/0363657 A1\* 12/2015 Shigemura ......... G06K 9/00845
382/104
2017/0015198 A1   1/2017 Suzuki

FOREIGN PATENT DOCUMENTS

| JP | 2002-025000 A | 1/2002 |
|----|---------------|--------|
| JP | 2007004521 A | 1/2007 |

(Continued)

*Primary Examiner* — Thomas S McCormack
(74) *Attorney, Agent, or Firm* — Harness, Dickey & Pierce, P.L.C.

(57) ABSTRACT

A driving teaching device is provided. The driving teaching device for a vehicle includes a visual attraction portion and a confirmation determination portion. The visual attraction portion guides, as an attractive display, a visual line of a driver to a confirmation object to which a safety confirmation is to be executed by the driver. The confirmation determination portion determines whether the driver executes the safety confirmation to the confirmation object. The driving teaching device further includes a reaction determination portion and a feedback portion. The reaction determination portion determines a reaction degree of the driver to the attractive display. The feedback portion provides information based on the reaction degree determined by the reaction determination portion when the confirmation determination portion determines that the driver executes the safety confirmation to the confirmation object.

11 Claims, 5 Drawing Sheets

(51) Int. Cl.
*B60W 50/14* (2020.01)
*B60W 30/095* (2012.01)
*G08G 1/16* (2006.01)

(52) U.S. Cl.
CPC ..... *B60W 30/0956* (2013.01); *B60W 2552/53* (2020.02); *G08G 1/166* (2013.01); *G08G 1/167* (2013.01)

(56) References Cited

FOREIGN PATENT DOCUMENTS

| | | | |
|---|---|---|---|
| JP | 2008040977 | A | 2/2008 |
| JP | 2011198037 | A | 10/2011 |
| JP | 2014099105 | A | 5/2014 |
| JP | 2014144096 | A | 8/2014 |
| JP | 2015141432 | A | 8/2015 |
| JP | 2015193317 | A | 11/2015 |

\* cited by examiner

FIG. 3

|  | BEGINNER STAGE | | | INTERMEDIATE STAGE | EXPERT STAGE |
| --- | --- | --- | --- | --- | --- |
|  | LOWER LEVEL | MIDDLE LEVEL | UPPER LEVEL | | |
| DISPLAY COLOR | YELLOW | | | GREEN | BLUE |
| DISPLAY FREQUENCY | · ALL | | | ·WEAK DRIVING SCENE<br>·NEW DRIVING SCENE | ·EXTRACTED WEAK DRIVING SCENE<br>·NEW DRIVING SCENE |

FIG. 4

| EXCELLENT | GREAT | GOOD |
| --- | --- | --- |
| 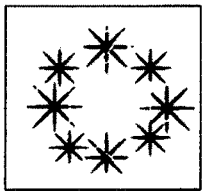 | 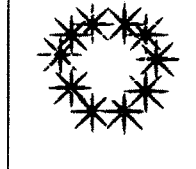 | 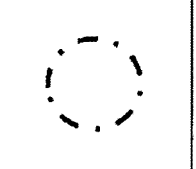 |

FIG. 5

|  | BEGINNER STAGE | | | INTERMEDIATE STAGE | EXPERT STAGE |
| --- | --- | --- | --- | --- | --- |
|  | LOWER LEVEL | MIDDLE LEVEL | UPPER LEVEL | | |
| SYMBOL INDICATIVE OF PROFICIENCY FACTOR |  |  |  |  |  |

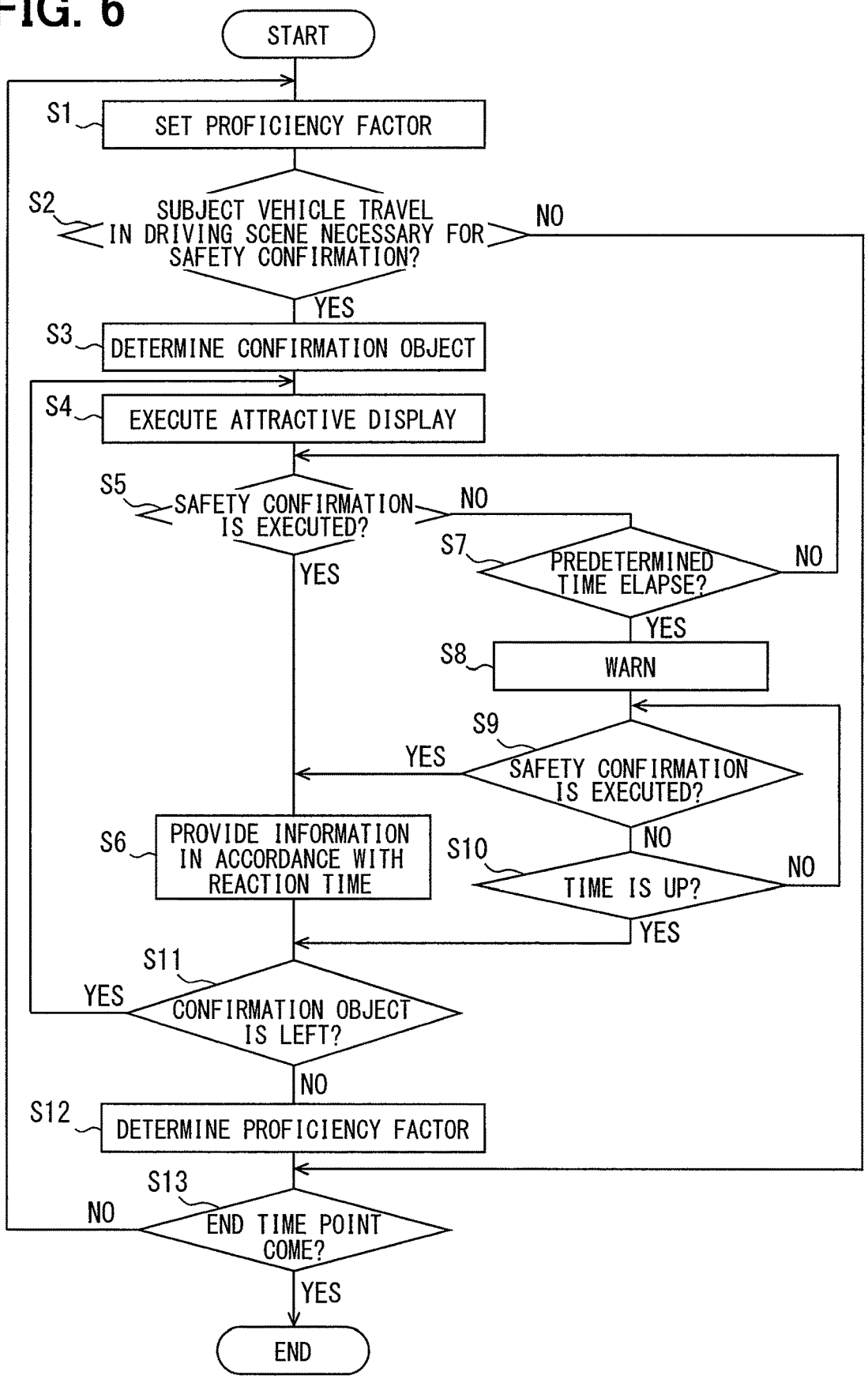

DRIVING TEACHING DEVICE

CROSS REFERENCE TO RELATED APPLICATIONS

This application is a U.S. National Phase Applications under 35 U.S.C. 371 of International Application No. PCT/JP2017/002205 filed on Jan. 24, 2017 and published in Japanese as WO/2017/138343 A1 on Aug. 17, 2017. This application is based on and claims the benefit of priority from Japanese Patent Application No. 2016-023029 filed on Feb. 9, 2016. The entire disclosures of all of the above applications are incorporated herein by reference.

TECHNICAL FIELD

The present disclosure relates to a driving teaching device.

BACKGROUND ART

Conventionally, a technique that guides a driver to a safety confirmation is known. Patent Literature 1 discloses that multiple LEDs are arranged in front of the driver, and when the driver waits for turning right, each of the multiple LEDs sequentially turn on from left to right. This configuration can guide the driver in the safety confirmation.

PRIOR ART LITERATURE

Patent Literature

Patent Literature 1: JP 2015-141432 A

SUMMARY OF INVENTION

A technique that guides a driver to a safety confirmation preferably provides a driver's skill improvement of performing a safety confirmation by following the guided safety confirmation repeatedly. Thus, the technique needs to attract the driver into the guided safety confirmation.

In view of the foregoing difficulties, it is an object of the present disclosure to provide a driving teaching device that enables a driver to be attracted into a guided safety confirmation.

According to an aspect of the present disclosure, a driving teaching device is provided. The driving teaching device for a vehicle includes a visual attraction portion and a confirmation determination portion. The visual attraction portion guides, as an attractive display, a visual line of a driver to a confirmation object to which a safety confirmation is to be executed by the driver. The confirmation determination portion determines whether the driver executes the safety confirmation to the confirmation object. The driving teaching device further includes a reaction determination portion and a feedback portion. The reaction determination portion determines a reaction degree of the driver to the attractive display. The feedback portion provides information based on the reaction degree determined by the reaction determination portion when the confirmation determination portion determines that the driver executes the safety confirmation to the confirmation object.

With the driving teaching device, the information is provided based on the reaction degree of the driver to the attractive display that guides the visual line of the driver when it is determined that the safety confirmation to the confirmation object, to which the safety confirmation is to be executed, is executed by the driver of the vehicle. Thus, the information provision is changed based on the reaction degree of the driver. The information provision is changed based on the reaction degree of the driver, so that there is a high possibility that the driver intends to react to the attractive display in order to cause the driving teaching device to change the information provision. Thus, the driving teaching device can attract the driver into the guided safety confirmation.

BRIEF DESCRIPTION OF DRAWINGS

The above and other objects, features and advantages of the present invention will become more apparent from the following detailed description made with reference to the accompanying drawings. In the drawings:

FIG. 3 is a diagram showing a change of an attractive display corresponding to a proficiency factor of a safety confirmation of a driver;

FIG. 4 is a diagram showing an information provision corresponding to a reaction time to the attractive display;

FIG. 5 is a diagram showing a display of a symbol indicative of the proficiency factor of the safety confirmation of the driver;

FIG. 6 is a flowchart showing a drive teaching relation procedure of the driving teaching device.

EMBODIMENTS FOR CARRYING OUT INVENTION

Hereinafter, multiple embodiments and multiple modifications of the present disclosure will be described with reference to the drawings. In each embodiment, same or similar portions are denoted by the same or the similar reference symbols, respectively, and their repetitive description might be omitted. In the case where only a part of a configuration is described, the precedingly described embodiment can be applied to the other part of the configuration.

The following embodiments are described corresponding to an area for which left-hand traffic is legislated. The following embodiments are performed with reversing right and left in an area for which right-hand traffic is legislated.

First Embodiment

Configuration of Drive Assistance System 1

Hereinafter, a first embodiment of the present disclosure will be described with reference to the drawings.

Figure 1:
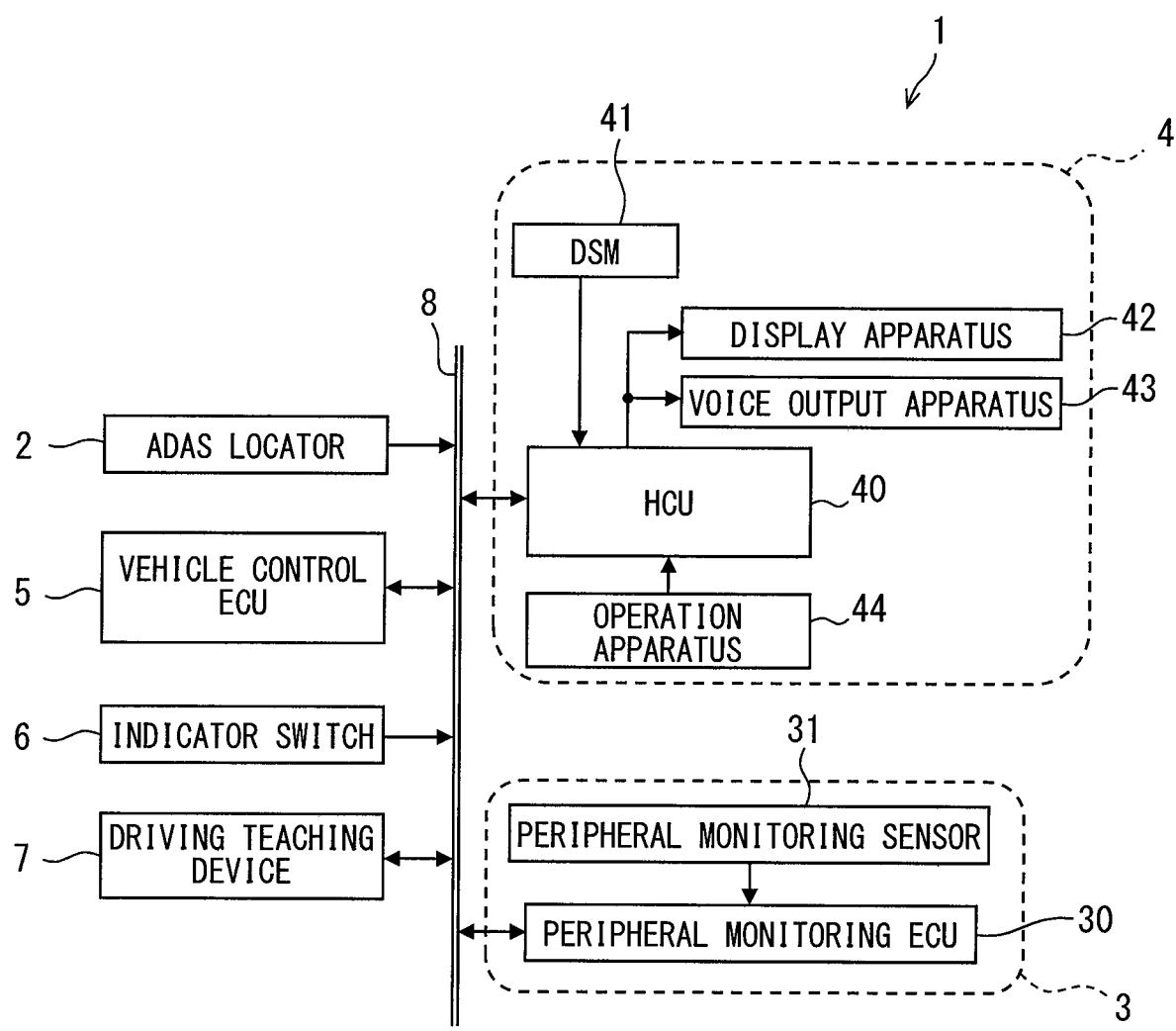
FIG. 1 is a diagram showing an exemplary configuration of a drive assistance system.

As shown in FIG. 1, a drive assistance system 1 attached to a vehicle includes an ADAS (i.e., Advanced Driver Assistance Systems) locator 2, a peripheral monitoring system 3, a HMI (i.e., Human Machine Interface) system 4, a vehicle control ECU 5, an indicator switch 6, and a driving teaching device 7. The ADAS locator 2, the peripheral monitoring system 3, the HMI system 4, the vehicle control ECU 5, the indicator switch 6 and the driving teaching device 7 are connected to vehicle LAN 8, for example. The vehicle that includes the drive assistance system 1 will be referred to as a subject vehicle.

The ADAS locator 2 includes a GNSS receiver, an inertial sensor, and a memory. The inertial sensor may be provided by a 3D gyroscope sensor. The memory stores map data. The GNSS (i.e., Global Navigation Satellite System) receiver receives a positioning signal from multiple satellites. The 3D gyroscope sensor may include a triaxial gyro sensor and a triaxial acceleration sensor.

The ADAS locator 2 measures a position of the subject vehicle in combination with the positioning signal received by the GNSS receiver and a measurement result of the inertial sensor. The position of the subject vehicle may be represented by coordinates of longitude and latitude. The ADAS locator 2 reads out link data of a route in front of the subject vehicle, node data, a road shape, and map data of a center point of an intersection or the like from the memory. The ADAS locator 2 successively outputs the position of the subject vehicle and the readout map data of the route in front of the subject vehicle to the vehicle LAN 8.

The link data may be provided by a specific number (i.e., link ID), a link length indicative of a length of the link, a link direction, link shape information, node coordinates (i.e., longitude and latitude) and a road attribute. The specific number specifies the link. The node coordinates include a starting point and a terminal of the link. The road attribute may be provided by a road name, a road type, a road width, a traffic lane number, and a speed limit value. The node data may be provided by a node ID, the node coordinates, a node name, a node type, a connection link ID, and an intersection type. The node ID represents the specific numbers of the nodes assigned to each node on the map. The connection link ID represents the link ID of the link connected to the node.

The map data may be received from an outside server of the subject vehicle using a vehicle communication module. The vehicle communication module may be provided by a DCM (i.e., Data Communication Module) attached to the subject vehicle employed for telematics communication.

The peripheral monitoring system 3 includes a peripheral monitoring ECU 30 and a peripheral monitoring sensor 31. The peripheral monitoring system 3 detects an obstacle, such as a moving object or a stationary object. The moving object may include a pedestrian, an animal except for human, a bicycle, a motorcycle, and another vehicle. The stationary object may include a falling object on the road, a guardrail, a curbstone, and a tree. The peripheral monitoring system 3 detects a road marking, such as a traveling lane line or a stop line.

The peripheral monitoring sensor 31 may be provided by a peripheral monitoring camera and a sensor. The sensor may include a millimeter wave radar, a sonar, and LIDAR (i.e., Light Detection and Ranging/Laser Imaging Detection and Ranging). The peripheral monitoring camera captures the obstacle within a predetermined area around the subject vehicle. The millimeter wave radar transmits a prospecting wave to the predetermined area around the subject vehicle. The peripheral monitoring camera may be provided by a stereo camera or a monocular camera. The peripheral monitoring camera successively outputs the successively captured camera to the peripheral monitoring ECU 30. The sensor, which transmits the prospecting wave, such as the sonar, the millimeter wave radar, or LIDAR successively outputs a prospect result to the peripheral monitoring ECU 30. The prospect result is obtained based on the reception signal received when the wave is reflected by the obstacle.

The peripheral monitoring sensor 31 may be provided by one type of the sensor or various types of sensors. The peripheral monitoring camera and the millimeter wave radar sensors may detect the obstacle in front of the subject vehicle. That is, the various types of the peripheral monitoring sensors 31 may detect the obstacle in the same sensing area.

The peripheral monitoring ECU 30 includes a CPU, a volatile memory, a non-volatile memory, an I/O, and a bus. The CPU, the volatile memory, the non-volatile memory, and the I/O are connected through the bus. The peripheral monitoring ECU 30 executes various kinds of operations by running a control program stored in the non-volatile memory. A part of or all function executed by the peripheral monitoring ECU 30 may be provided by a hardware including one or multiple ICs or the like.

The peripheral monitoring ECU 30 recognizes a driving circumstance of the subject vehicle based on the sensing result of the peripheral monitoring sensor 31. The peripheral monitoring ECU 30 detects a distance, a relative position, a relative speed, or the like between the subject vehicle and an object that exist around the subject vehicle based on the data of the capture image received from the peripheral monitoring sensor 31. The peripheral monitoring ECU 30 may detect the vehicle, such as the motor vehicle, the cycle, or the motor cycle and the pedestrian using publicly known image recognition procedure, such as template matching. In the present embodiment, the peripheral monitoring ECU 30 detects at least three types of objects, such as the motor vehicle, a two-wheel vehicle of the bicycle or motor bicycle, and pedestrian. Distinction of the types of the objects may be achieved using templates which correspond to the objects, and the templates are employed for the template matching.

When the monocular camera is employed as the peripheral monitoring camera, the peripheral monitoring ECU 30 determines the relative position of the object to the subject vehicle and distance between the subject vehicle and the object. The relative position and the distance are determined based on an arrangement position of the peripheral monitoring camera to the subject vehicle, a direction of optical axis, or the position of the object in the captured image. When a compound camera is employed as the peripheral monitoring camera, the peripheral monitoring ECU 30 determines the distance between the subject vehicle and the object based on a parallax amount of the pair of the cameras. The relative speed of the object to the subject vehicle is determined based on a change rate of the distance between the subject vehicle and the object. When the peripheral monitoring ECU 30 detects a vehicle and the vehicle travels in front of the subject vehicle, the detected object is regarded to as a preceding vehicle.

The peripheral monitoring ECU 30 may detect the road marking, such as the traveling lane and the stop line, and the position of the road marking to the subject vehicle from the data of the captured image received from the peripheral monitoring sensor 31. The road marking, such as the traveling lane line or the stop line is detected using a publicly known image recognition procedure, such as an edge detection technique. The position of the road marking to the subject vehicle is detected based on the arrangement position of the peripheral monitoring camera to the subject vehicle, the direction of optical axis, and the position of the object in the captured image. The road marking and the position of the road marking to the subject vehicle may be detected using LIDAR.

The peripheral monitoring ECU 30, regarding the object existing around the subject vehicle, detects the distance from the subject vehicle, the relative position to the subject vehicle, and the relative speed to the subject vehicle. The detection is executed using the millimeter radar, the sonar, or LIDAR. The prospecting wave transmitted from the peripheral monitoring sensor 31, such as the millimeter radar, the sonar, or LIDAR reflects on the object. The peripheral monitoring ECU 30 detects the object based on the reception strength of the reflection wave. The peripheral monitoring ECU 30 calculates the distance between the subject vehicle and the object based on a time from the transmission of the prospecting wave to the reception of the reflection wave. The peripheral monitoring ECU 30 detects the direction of the object to the subject vehicle based on the direction of the prospecting wave capable of reflecting on the object. The peripheral monitoring ECU 30 detects the relative position of the object to the subject vehicle based on the distance between the subject vehicle and the object and the direction of the object to the subject vehicle. The peripheral monitoring ECU 30 detects the relative speed of the object to the subject vehicle using a publicly known method based on the Doppler shift related to the transmitted prospecting wave and the reflected wave. The peripheral monitoring ECU 30 may detect the relative speed of the object to the subject vehicle based on a time change rate of the distance between the subject vehicle and the object. The peripheral monitoring ECU 30 outputs, as monitor information, the various types of detected information to the vehicle LAN 8.

The peripheral monitoring ECU 30 may recognize the driving circumstance of the subject vehicle using another factor except for the sensing result of the peripheral monitoring sensor 31. The peripheral monitoring ECU 30 may detect, related to another vehicle existing around the subject vehicle, the distance from the subject vehicle, the relative position to the subject vehicle, and the relative speed to the subject vehicle. The detection may be executed based on the position and the speed of another vehicle obtained from the vehicle to vehicle communication or the vehicle to infrastructure communication through a communication apparatus of the subject vehicle.

The HMI system 4 includes a HCU (Human Machine Interface Control Unit) 40, a DSM (Driver Status Monitor) 41, a display apparatus 42, a voice output apparatus 43, and an operation apparatus 44. The HMI system 4 may receive an input operation of the driver of the subject vehicle, provide the driver of the subject vehicle with information, and monitor a state of the driver of the subject vehicle.

The DSM 41 may include a near infrared light source, a near infrared camera, and a control unit. The control unit controls the near infrared light source and the near infrared camera. In the DSM 41, the near infrared camera may be attached to an upper surface of instrument panel with an attitude oriented to a driver's seat of the subject vehicle. The DSM 41 captures, by the infrared camera, a driver's head to which near infrared light is irradiated by the near infrared light source. The image captured by the near infrared camera is analyzed by the control unit. The control unit may detect a direction of a face or a visual line of the driver from the captured image.

The DSM 41 may detect a part of face, such as an outline, an eye, a nose, or a mouth by picture recognition processing using the image of face captured by the near infrared camera. The DSM 41 may detect the direction of the face based on a relative position between the parts of the face. The DSM 41 may detect a pupil and a corneal reflex of the driver by picture recognition processing using the image of face captured by the near infrared camera. The DSM 41 may detect the direction of the visual line based on a relative position of the detected pupil and the detected corneal reflex.

The DSM 41 may detect the visual line in consideration with the direction of the face. The DSM 41 transmits the information of the detected direction of the face or the visual line of the driver to the vehicle LAN 8. In the present embodiment, the DSM 41 transmits the information of the visual line.

The display apparatus 42 may be provided by a combined instrument, a CID (Center Information Display), a HUD (Head-Up Display), or an electronic mirror. The combined instrument is attached in front of the driver's seat. The CID is attached to an upper part of a center cluster in the subject vehicle. The combined instrument displays various types of images of information on a crystal liquid display based on the image data obtained by the HCU 40.

The HUD projects a light of the image to a predetermined projection area of the windshield. The light of the image is generated based on the image data obtained from the HCU 40. The light of the image reflected on the windshield surface close to a compartment is recognized by the driver sit on the driver's seat. The driver visually recognizes a virtual image projected by the HUD and an outside view in front of the subject vehicle, which are superimposed.

The electronic mirror is a display device that successively displays the image of a laterally rear of the subject vehicle successively captured by the peripheral monitoring camera. The electronic mirror is provided by a right electronic mirror and a left electronic mirror. The right electronic mirror displays the captured image from right to laterally right rear of the subject vehicle. The left electronic mirror displays the captured image from left to laterally left rear of the subject vehicle. The right electronic mirror and the left electronic mirror may be attached to roots of pillars, which are located to edges of the windshield. The electronic mirror may include a rear electronic mirror that captures an image in a predetermined area of the rear of the subject vehicle. The electronic mirror is capable of displaying a superimposed image that includes the image captured by the peripheral monitoring camera and the image generated by the HCU 40.

The voice output apparatus 43 may be provided by an audio speaker. The audio speaker is attached to a door lining of the subject vehicle. The audio speaker provides a passenger with information by outputting sound.

The operation apparatus 44 is provided by a group of switches operated by the driver of the subject vehicle. The operation apparatus 44 may include a steering switch that is attached to a spoke part of a steering wheel of the subject vehicle, a touch switch integrated with the display apparatus 42, or the like.

The HCU 40 includes the CPU, the volatile memory, the non-volatile memory, the I/O, and the bus. The bus connects the CPU, the volatile memory, the non-volatile memory, and the I/O. The HCU 40 executes various types of procedures by running a control program stored in the non-volatile memory. A part of or all of functions executed by the HCU 40 may be configured by a hardware including one or multiple ICs or the like.

The vehicle control ECU 5 is provided by an electronic control apparatus that executes an acceleration and deceleration control or a steering control of the subject vehicle. The vehicle control ECU 5 may include a steering ECU that executes the steering control, a power unit control ECU that executes the acceleration and deceleration control, or a break ECU. The subject vehicle includes a various types of sensors, such as an accelerator position sensor, a break leg-power sensor, a steering angle sensor, or a speed sensor. The vehicle control ECU 5 acquires a detection signal output from the sensors, and outputs the detection signal to a cruise control apparatus. The cruise control apparatus may include an electronic control throttle, a break actuator, or an EPS (Electric Power Steering) motor. The vehicle control ECU 5 is capable of outputting the detection signal output from the various types of the sensors to the vehicle LAN 8.

The indicator switch 6 is provided by a switch that detects a right or left lamp lighting operation by an indicator lever. The indicator lever is provided by an operation member that controls the indicator of the subject vehicle to execute the lamp lighting operation. The indicator switch 6 outputs an indicator signal of right or left turn in response to the operation of the indicator lever to the vehicle LAN 8.

The driving teaching device 7 includes the volatile memory, the non-volatile memory, the I/O, and the bus. The bus connects the volatile memory, the non-volatile memory, and the I/O. The driving teaching device 7 executes various types of procedures by running a control program stored in the non-volatile memory. The driving teaching device 7 executes a procedure related to a drive teaching process. The drive teaching process includes an attractive display that guides the visual line to the confirmation object to which the safety confirmation is to be executed by the driver or an indication based on the degree of the reaction of the driver to the attract notice display. The procedure of the driving teaching device 7 will be described. A part of or all of functions executed by the driving teaching device 7 may be configured by a hardware including one or multiple ICs or the like.

Schematic Configuration of Driving Teaching Device 7

Figure 2:
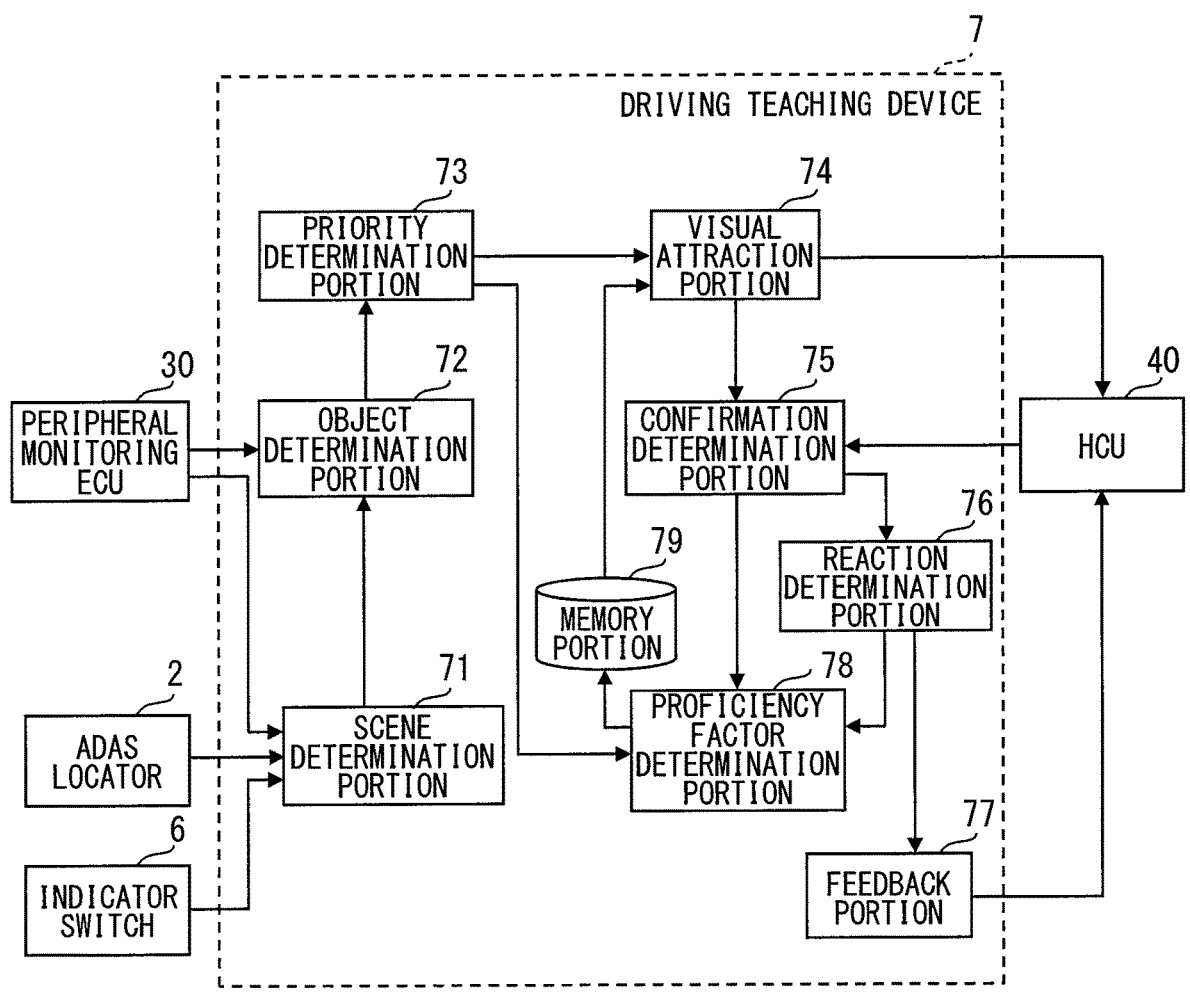
FIG. 2 is a diagram showing an exemplary configuration of driving teaching device according to a first embodiment.

With reference to FIG. 2, the schematic configuration of the driving teaching device 7 will be described. The driving teaching device 7 includes a scene determination portion 71, an object determination portion 72, a priority determination portion 73, a visual attraction portion 74, a confirmation determination portion 75, a reaction determination portion 76, a feedback portion 77, a proficiency factor determination portion 78, and a memory portion 79.

The scene determination portion 71 determines, based on the information of a driving state of the subject vehicle, whether the subject vehicle travels in a driving scene that needs the safety confirmation by the driver. The information of the driving state may be obtained from the ADAS locator 2, the indicator switch 6, or the peripheral monitoring ECU 30. In this embodiment, the driving scene that needs the safety confirmation by the driver may include a "wait for right turn", a "wait for left turn", a "lane change to right", and a "lane change to left". The driving scenes of the "wait for right turn", the "wait for left turn", the "lane change to right", and the "lane change to left" are determined based on the position of the subject vehicle, the position of the center of the intersection, and the indicator signal. The position of the subject vehicle and the position of the center of the intersection are obtained by the ADAS locator 2. The indicator signal is obtained by the indicator switch.

Assume that the distance from the subject vehicle to the center of the front intersection is shorter than a first predetermined distance, and the scene determination portion 71 obtains the indicator signal indicative of the lighting of the right indicator lamp, the scene determination portion 71 may determine that the driving scene of the subject vehicle is the "wait for right turn." Assume that the distance from the subject vehicle to the center of the front intersection is shorter than the first predetermined distance, and the scene determination portion 71 obtains the indicator signal indicative of the lighting of the left indicator lamp, the scene determination portion 71 may determine that the driving scene of the subject vehicle is the "wait for left turn." The first predetermined distance may be arbitrarily set shorter than a distance to be prevented from changing lanes in front of the intersection.

The drive scenes, such as the "wait for right turn" or the "wait for left turn" may be further subdivided based on conditions, such as the road shape whether a three-way junction or a cross road, a presence or absence of a traffic signal in the intersection, or the like.

Assume that the distance from the subject vehicle to the center of the front intersection is shorter than a second predetermined distance, and the scene determination portion 71 obtains the indicator signal indicative of the lighting of the right indicator lamp, the scene determination portion 71 may determine that the driving scene of the subject vehicle is the "lane change to right." Assume that the distance from the subject vehicle to the center of the front intersection is shorter than the second predetermined distance, and the scene determination portion 71 obtains the indicator signal indicative of the lighting of the left indicator lamp, the scene determination portion 71 may determine that the driving scene of the subject vehicle is the "lane change to left." The second predetermined distance may be arbitrarily set shorter than a distance to be prevented from changing lanes in front of the intersection.

Assume that a priority of the safety confirmation to the confirmation object is changed stepwise in one driving scene, the scene determination portion 71 may determine the scene corresponding to the phases. In the present embodiment, the driving scene of the "wait for right turn" may be divided into a "first half wait for right turn" and a "last half wait for right turn." The "first half wait for right turn" is defined until the vehicle arrives at the center of the intersection. The "last half wait for right turn" is defined after the vehicle arrives at the center of the intersection.

The object determination portion 72 determines, corresponding to the determined driving scene, the confirmation object to which the safety confirmation is to be executed by the driver when the scene determination portion 71 determines that the subject vehicle travels in the driving scene that needs the safety confirmation. An exemplary determination manner of the confirmation object will be described below.

The object determination portion 72 extracts the confirmation object based on the determined driving scene with reference to correspondence of the safety confirmation to the confirmation object for each of the driving scenes. In this case, the safety confirmation to the confirmation object previously corresponds to the driving scene. The object determination portion 72 determines the confirmation object when an object that corresponds to the extracted confirmation object exists with reference to the monitor information obtained from the peripheral monitoring ECU 30. When the object that corresponds to the extracted confirmation object does not exist, the object determination portion 72 does not determine the extracted object as the confirmation object. Alternatively, the object determination portion 72 may determine the extracted confirmation object as the confirmation object.

Assume that the scene determination portion 71 may determine, as the driving scene, the "wait for right turn" and the "first half wait for right turn", or the "wait for right turn" and the "last half wait for right turn," the object determination portion 72 may extract, as the confirmation object, a "lead vehicle of opposite lane", a "left side space of lead vehicle of opposite lane", and a "crossroad diagonally right front of subject vehicle." The object of "lead vehicle of opposite lane" and the "left side space of lead vehicle of opposite lane" correspond to the motor vehicle or the two-wheel vehicle. The object of the "crossroad diagonally right front of subject vehicle" corresponds to the pedestrian or the two-wheel vehicle.

Assume that the scene determination portion 71 may determine, as the driving scene, the "wait for left turn," the object determination portion 72 may extract, as the confirmation object, the "lead vehicle of opposite lane", a "laterally left rear of subject vehicle", a "crossroad diagonally left front of subject vehicle." The object of the "laterally left rear of subject vehicle" corresponds to the two-wheel vehicle. The object of the "crossroad diagonally left front of subject vehicle" corresponds to the pedestrian or the two-wheel vehicle. Assume that the scene determination portion 71 may determine, as the driving scene, the "lane change to right," the object determination portion 72 may extract, as the confirmation object, a "preceding vehicle", a "rear of subject vehicle", and a "laterally right rear of subject vehicle." The object of the "preceding vehicle", the "rear of subject vehicle", and the "laterally right rear of subject vehicle" correspond to the motor vehicle or the two-wheel vehicle. Assume that the scene determination portion 71 may determine, as the driving scene, the "lane change to left," the object determination portion 72 may extract, as the confirmation object, the "preceding vehicle", the "rear of subject vehicle", and a "laterally left rear of subject vehicle." The object of the "laterally left rear of subject vehicle" corresponds to the motor vehicle or the two-wheel vehicle.

When the object determination portion 72 determines the multiple confirmation objects, the priority determination portion 73 determines priority of each of the multiple confirmation objects. The priority determination portion 73 may weight the confirmation object related to the priority. In this case, a larger priority weight is set to the confirmation object with an earlier approach order of the confirmation object to the subject vehicle.

The order that the confirmation object approaches the subject vehicle may be estimated that the order is early in case that the distance between the subject vehicle and the confirmation object is short. It may be estimated that the order is early in case that TTC (Time to Collision) is small. The TTC may be calculated by dividing a distance from the subject vehicle to a predicted cross position of the subject vehicle and the confirmation object by the relative speed of the confirmation object to the subject vehicle. The predicted cross position of the subject vehicle and the confirmation object may be calculated based on both predicted tracks of the subject vehicle and the confirmation object. The predicted track of the subject vehicle may be calculated on the assumption that the speed of the subject vehicle and a steering angle are constant. The predicted track of the confirmation object is calculated based on the over-time change of the position of the confirmation object.

The priority determination portion 73 may weight the priority of the confirmation object determined by the object determination portion 72 related to the priority. In this case, the weight is determined with reference to the relationship that the driving scene determined by the scene determination portion 71 previously corresponds to the priority of the confirmation object.

Assume that the scene determination portion 71 may determine, as the driving scene, the "wait for right turn" and the "first half wait for right turn," the priority weight of the "lead vehicle of opposite lane" is set to be greater than the priority weights of the "left side space of lead vehicle of opposite lane" and the "crossroad diagonally right front of subject vehicle." Assume that the scene determination portion 71 may determine, as the driving scene, the "wait for right turn" and the "last half wait for right turn," the priority weights of the "left side space of lead vehicle of opposite lane" and the "crossroad diagonally right front of subject vehicle" are set to be greater than the priority weight of the "lead vehicle of opposite lane."

Assume that the scene determination portion 71 may determine, as the driving scene, the "wait for left turn." The priority weights of the "laterally left rear of subject vehicle" and the "crossroad diagonally left front of subject vehicle" are set to be greater than the priority weight of the "lead vehicle of opposite lane." The difference of the priority weights is caused because the subject vehicle that waits for turning left is prioritized even when the lead vehicle of the opposite lane is intended to turn right. Assume that the scene determination portion 71 may determine, as the driving scene, the "lane change to right." The priority weights of the "laterally right rear of subject vehicle", the "rear of subject vehicle", and the "preceding vehicle" are set to be greater in the described order. The priority weights of the "laterally left rear of subject vehicle" and the "crossroad diagonally left front of subject vehicle" are set to be greater than the priority weight of the "lead vehicle of opposite lane." The difference of the priority weights is caused because safety confirmation of the "preceding vehicle", the "rear of subject vehicle", and the "laterally right rear of subject vehicle" in this order is recommended. Assume that the scene determination portion 71 may determine, as the driving scene, the "lane change to left," the priority weights are set similarly to the "lane change to right" except for the different safety confirmation to right and left.

The priority determination portion 73 integrates the above described priority weight for each of the confirmation objects, and then determines the priority to the each of the confirmation objects. The priority determination portion 73 sets a higher priority to a confirmation object that has a higher priority weight. As described above, the priority weight includes the weight related to the order of the approach to the subject vehicle and the weight related to the driving scene. The priority may be determined based on one of the weights. A weight other than the above-described weight may be employed.

The priority determination portion 73 determines the priority corresponding to the phases into which the identical driving scene is divided. In this configuration, when the phase in the identical driving scene is changed, the prioritized confirmation object is changed.

The visual attraction portion 74 transmits an instruction of the execution of the attractive display that guides the visual line to the confirmation object to which the safety confirmation is to be executed by the driver. The visual attraction portion 74 may transmit an instruction of displaying the image that superimposes an enhancement image emphasizing the confirmation object on the confirmation object to the HCU 40. The display of the enhancement image corresponds to the attractive display. The enhancement image may not conceal the confirmation object. The enhancement image may have a frame shape that surrounds the part of or the whole of the confirmation object. The frame shape may be provided by a ring shape or a rectangular frame shape. The frame shape may lack a part of the frame. Another symbol other than the frame shape may be superimposed on the top or the bottom of the confirmation object. The visual attraction portion 74 can guide the visual line of the driver to the confirmation object by superimposing the enhancement image that emphasizes the confirmation object.

When receiving the instruction of the display of the image that superimposes the enhancement image on the confirmation object, the HCU 40 determines a display position of the enhancement image using the monitor information related to the confirmation object obtained from the peripheral monitoring ECU 30. When the confirmation object is located in front of the subject vehicle, the HCU 40 determines, in the projection area of the HUD, a position of the virtual image of the enhancement image that emphasizes the confirmation object in the outside view in front of the subject vehicle. Assume that a position of a view point of the driver to the position of the subject vehicle is set, and the driver gazes at the confirmation object from the view point, the projection area that intersects the visual line is determined as the display area of the virtual image of the enhancement image. The position of the view point of the driver to the position of the subject vehicle may be set based on the position of the eye detected by the DSM 41, the arrangement position of the near infrared camera of the DSM 41, and the direction of the direction of optical axis. Alternatively, the position of the view point of the driver to the position of the subject vehicle may be fixed on an eye point of an average driver or may be set based on a position of the driver's seat.

Assume that the confirmation object is located beside the subject vehicle or behind the subject vehicle. The HCU 40 determines the position of the enhancement image displayed on the captured image of the electronic mirror. The HCU 40 may determine, as the position of the enhancement image, the position of the confirmation object displayed on the captured image of the electronic mirror.

The HCU 40 controls the display apparatus 42 to display the enhancement image on the determined position after the HCU 40 determines the display position of the enhancement image. When the HCU 40 determines that the enhancement image is displayed in the projection area of the HUD, the HCU 40 controls the HUD to display the virtual image. When the HCU 40 determines that the enhancement image is displayed in the captured image of the electronic mirror, the HCU 40 controls the electronic mirror to display the image.

Assume the object determination portion 72 determines that there are the multiple confirmation objects. In this case, the visual attraction portion 74 may transmit an instruction to display the enhancement images in a decreasing order from the confirmation object that has the highest priority determined by the priority determination portion 73. The visual attraction portion 74 controls the HCU 40 to display the enhancement images in the decreasing order from the confirmation object that has the highest priority. With this configuration, the visual line of the driver can be guided from the confirmation object that has the higher priority. The display of the enhancement images related to the multiple confirmation objects in the decreasing order corresponds to the attractive display. A time interval of the display of the enhancement image in decreasing order from the confirmation object that has the highest priority may be set to a longer time interval than a time that is considered to be necessary for a normal safety confirmation.

The visual attraction portion 74 changes a manner of the attractive display corresponding to a safety confirmation proficiency factor of the driver. The proficiency factor may be divided into three stages of an expert stage, an intermediate stage, and a beginner stage. The beginner stage may be further divided into three levels of an upper level, a middle level, and a lower level. The proficiency factor may be determined by the proficiency factor determination portion 78, which is described below, based on a record history of the safety confirmation of the driver. In a default state, which the proficiency factor determination portion 78 has not determined the proficiency factor, the proficiency factor is temporarily set based on an age of the driver, a grade of automobile insurance, or the like. The proficiency factor is temporarily set to a higher level by the age increasing when the age of the driver is under a predetermined age. The proficiency factor is temporarily set to a lower level by the age increasing when the age of the driver is over the predetermined age. The proficiency factor is temporarily set to high when the grade of automobile insurance is high. The age, the grade of automobile insurance, or the like is input using the operation apparatus 44.

The change of the attractive display corresponding to the proficiency factor will be described with reference to FIG. 3. The change of the attractive display corresponding to the proficiency factor may be executed by a color of the enhancement image that emphasizes the confirmation object. As shown in FIG. 3, the enhancement image is set to an attractive color with a decrease of the proficiency factor of the driver. As shown in FIG. 3, the proficiency factor of the beginner stage is set to yellow, the proficiency factor of the intermediate stage is set to green, and the proficiency factor of the expert stage is set to be blue.

Frequency of the display of the enhancement image may be decrease with an increase of the proficiency factor. As shown in FIG. 3, when the proficiency factor is the beginner stage, the enhancement image is shown at all driving scenes determined by the scene determination portion 71. When the proficiency factor is the intermediate stage, the enhancement image is shown at a new driving scene and a weak driving scene form the driving scene determined by the scene determination portion 71. When the proficiency factor is the expert stage, the enhancement image is shown at a new driving scene and a part of the weak driving scene form the driving scene determined by the scene determination portion 71. The weak driving scene may be determined based on the record history of the safety confirmation of the driver. The manner that the part of the weak driving scene is selected to be the object may be achieved that when the weak driving scene appears for a predetermined number, the weak driving scene is selected to be the object.

The confirmation determination portion 75 determines whether the driver executes the safety confirmation to the confirmation object based on the information of the direction of the visual line of the drive detected by the DSM 41 and successively output from the HCU 40. When the detected visual line of the driver is oriented to the confirmation object for a threshold time, the confirmation determination portion 75 determines that the driver executes the safety confirmation to the confirmation object. The state of which the detected visual line of the driver is oriented to the confirmation object is permitted in an error range of the visual line of the driver and the confirmation object.

The threshold time may represent a staying time considered to be necessary for the safety confirmation. The staying time considered to take the safety confirmation changes based on a traveling state of the subject vehicle and a relative position. The traveling state of the subject vehicle may include the speed. The relative position may include the distance between the subject vehicle and the confirmation object. Thus, the threshold time may change based on the traveling state of the subject vehicle or the relative position between the subject vehicle and the confirmation object. The threshold time may change to long time as the confirmation object that takes long time to be recognized is selected. For example, the "two-wheel vehicle" and the "pedestrian" have more types than the "motor vehicle". Thus, it is considered that the "two-wheel vehicle" and the "pedestrian" take longer time to be recognized than the "motor vehicle". In this configuration, the threshold time of the "two-wheel vehicle" and the "pedestrian" is set to be longer time than the threshold time of the "motor vehicle". The time that needs to execute the safety confirmation becomes long with an increase of the age from a fixed age. Thus, the threshold time is set to be longer time from the age of the fixed age. The age may be input from the operation apparatus 44.

When the visual attraction portion 74 displays the enhancement images in decreasing order from the confirmation objects that have the highest priority, the confirmation determination portion 75 determines whether the driver executes the safety confirmation to each of the confirmation objects. The confirmation determination portion 75 determines whether the driver executes the safety confirmation to the confirmation object using the information of the visual line of the driver from the viewpoint of a precision of the safety confirmation. Alternatively, the confirmation determination portion 75 determines whether the driver executes the safety confirmation to the confirmation object using the information of the direction of the face of the drive.

The confirmation determination portion 75 successively stores the information of the visual line of the driver before the scene determination portion 71 determines that the subject vehicle travels in the driving scene that needs the safety confirmation. The confirmation determination portion 75 may determine whether the driver executes the safety confirmation to the confirmation object using the information of the stored visual line of the driver. Assume that the confirmation determination portion 75 determines that the driver executes the safety confirmation to the confirmation object before the scene determination portion 71 determines that the subject vehicle travels in the driving scene that needs the safety confirmation. The attractive display may not be executed to the confirmation object. For example, when the lane needs to be changed, the driver executes the safety confirmation behind the subject vehicle before the indicator lever is operated. In this case, assume that the scene determination portion 71 may determine, as the driving scene, the "lane change to right" or the "lane change to left." The confirmation determination portion 75 determines that the driver has executed the safety confirmation to the rear of the subject vehicle, and does not execute the attractive display to the rear of subject vehicle. This configuration can prevent the confirmation determination portion 75 from executing the attractive display even when the driver has executed the safety confirmation, and can prevent the driver from feeling bothered. The reaction determination portion 76, which will be described below, may determine the confirmation object to which the safety confirmation has been executed as a best reaction degree.

The reaction determination portion 76 determines a reaction degree of the driver to the attractive display. The reaction determination portion 76 determines, as the reaction degree of the driver to the attractive display, a reaction time. The reaction time is defined from the time at which the visual attraction portion 74 displays the enhancement image, which emphasizes the safety confirmation, to the time point at which the confirmation determination portion 75 determines that the driver executes the safety confirmation to the confirmation object. The time may be measured using a timer circuit or the like. When the visual attraction portion 74 displays the confirmation objects in decreasing order from the confirmation object that has the highest priority, the reaction determination portion 76 determines the above-described reaction time to each of the confirmation objects.

When the confirmation determination portion 75 determines that the driver executes the safety confirmation to the confirmation object, the feedback portion 77 transmits an instruction to provide information based on the reaction time determined by the reaction determination portion 76 to the HCU 40. When the visual attraction portion 74 displays the confirmation objects in decreasing order from the confirmation object that has the highest priority, the feedback portion 77 provides information of each of the confirmation object corresponding to the reaction time. The information is provided each time the confirmation determination portion 75 determines that the driver executes the safety confirmation to the confirmation object. The information provision may include displaying an image to the display apparatus 42, outputting a sound effect form the voice output apparatus 43. The information provision corresponding to the reaction time may include praising the reaction of the driver with an attractive provision as the reaction time becomes shorter.

An example of the information provision corresponding to the reaction time corresponding to the attractive display will be described with reference to FIG. 4. FIG. 4 shows an exemplary configuration of which the phases of the information provision corresponding to the reaction time includes "Excellent", "Great", and "Good" in increasing order of the time from the shortest reaction time. As shown in FIG. 4, the information provision corresponding to the reaction time may be executed by the attractive display as the reaction time becomes shorter. The display corresponding to the reaction time may be superimposed on the position of the confirmation object. An attractive sound may be output as the reaction time becomes shorter.

Assume that the visual attraction portion 74 displays the enhancement image, which emphasizes the confirmation object, but the confirmation determination portion 75 determines that the driver does not execute the safety confirmation to the confirmation object even when the predetermined time, which exceeds the threshold time, elapses, the feedback portion 77 may transmit an instruction to provide information that controls the drive to notice the confirmation object to the HCU40. The information provision that controls the drive to notice the confirmation object may include execution of further emphasis or again display of the enhancement image that has been completed. The execution of further emphasis may include flash of the enhancement image. Alternatively, the information provision may include an output of warning sound from the voice output apparatus 43 or a display of warning to the display apparatus 42.

Assume that a time point of the information provision that controls the drive to notice the confirmation object conflicts with a time point of the display of a next enhancement image related to the confirmation object of which the driver needs to execute the safety confirmation, the information related to the confirmation object is provided with an earlier approach order, which is described above, of the subject vehicle to the confirmation object.

The feedback portion 77 may display a symbol (refer to FIG. 5) indicative of the proficiency factor of the safety confirmation, which is determined by the proficiency factor determination portion 78 described below. With the display of the symbol indicative of the proficiency factor, it is concerned that the driver intends to improve the proficiency factor, and is attracted into the guided safety confirmation. The symbol indicative of the proficiency factor may be displayed on the display apparatus 42, such as the CID, through the HCU 40. The symbol indicative of the proficiency factor may be displayed from on state of the power to off state of the power of the driving teaching device 7. Alternatively, the symbol indicative of the proficiency factor may be displayed when the proficiency factor determination portion 78 determines the proficiency factor. The symbol may be shown at another time point.

The proficiency factor determination portion 78 determines the proficiency factor of the safety confirmation of the driver. Assume that the object determination portion 72 determines the multiple confirmation objects, the proficiency factor determination portion 78 may determine the proficiency factor of the safety confirmation of the driver by comparing the number of the confirmation objects with the number of the confirmation object that the driver has executed the safety confirmation determined by the confirmation determination portion 75. The memory portion 79 stores the proficiency factor determined by the proficiency factor determination portion 78. The memory portion 79 may be provided by a non-volatile memory.

The proficiency factor may be determined in a manner that the larger priority weight is set to the confirmation object with the higher priority determined by the priority determination portion 73, and a score is calculated based on the number of the confirmation object of which the driver has executed the safety confirmation. In this case, the calculated score corresponds to the proficiency factor. With this configuration, when the driver does not fail to execute the safety confirmation to the confirmation object that has a higher priority, the driver obtains a higher score. Alternatively, in addition to the above-described manner, the proficiency factor may be determined in a manner that the larger priority weight is set to the confirmation object with the shorter reaction time determined by the reaction determination portion 76, and then the score is calculated based on the execution of the safety confirmation and the reaction time. Alternatively, the proficiency factor may be determined in a manner that the number of the confirmation object of which the driver executes the safety confirmation to the confirmation object determined by the object determination portion 72 is calculated. That is, the proportion of the confirmation object of which the driver executes the safety confirmation is calculated. In this case, the proportion corresponds to the proficiency factor.

The proficiency factor determination portion 78 stores, as the record history of the safety confirmation of the driver, the proportion of the executed safety confirmation, the reaction time, or the like to the memory portion 79 for each of the scenes determined by the scene determination portion 71. The record history of the safety confirmation of the driver may be employed when the visual attraction portion 74 changes the attractive display related to the safety confirmation proficiency factor of the driver. The driving scene that is not stored in the record history may be determined to be the new driving scene. The driving scene is determined to be a weak driving scene when the proportion of the safety confirmation execution is small or the reaction time takes long time compared with another driving scene stored in the record history. A past weak driving scene may be determined that the driving scene at which the driver was not good when the proportion of the safety confirmation execution or the reaction time is changed to be an adequately improved value.

With reference to a flowchart in FIG. 6, a procedure related to the drive teaching executed by the driving teaching device 7 (hereinafter, referred to as a drive teaching relation procedure) will be described. The flowchart of FIG. 6 starts when an ignition power source of the subject vehicle turns on.

In step S1, when the memory portion 79 stores the proficiency factor of the safety confirmation of the driver, the visual attraction portion 74 reads out the proficiency factor of the driver, and then sets the readout proficiency factor. When the memory portion 79 does not store the proficiency factor of the safety confirmation of the driver, as described above, the visual attraction portion 74 temporarily sets the proficiency factor based on the age of the driver, the grade of automobile insurance, or the like.

In step S2, when the scene determination portion 71 determines that the subject vehicle travels in a driving scene that needs the safety confirmation by the driver (i.e., YES at S2), the procedure proceeds to step S3. When the scene determination portion 71 determines that the subject vehicle does not drive in a driving scene that needs the safety confirmation by the driver (i.e., NO at S2), the procedure proceeds to step S13. In step S3, the object determination portion 72 determines the confirmation object to which the safety confirmation is to be executed by the driver corresponding to the driving scene determined by the scene determination portion 71.

In step S4, the visual attraction portion 74 controls the HCU40 to execute the attractive display that guides the visual line of the driver to the confirmation object, which is determined in S3. Specifically, the enhancement image, which emphasizes the confirmation object, is displayed with the confirmation object superimposed. In S4, when the multiple confirmation objects is determined in S3, the visual attraction portion 74 controls the HCU40 to execute the attractive display by displaying the confirmation objects, which emphasizes the confirmation objects, in decreasing order of the priority, which is determined by the priority determination portion 73, of each of the confirmation objects.

In step S5, the confirmation determination portion 75 determines whether the driver executes the safety confirmation to the confirmation object. When the confirmation determination portion 75 determines that the driver executes the safety confirmation (i.e., YES at S5), the procedure proceeds to step S6. When the confirmation determination portion 75 determines that the driver does not execute the safety confirmation (i.e., NO at S2), the procedure proceeds to step S7. When the multiple confirmation objects are determined in S3, the operations of S5 to S10 are executed to each of the confirmation objects in the sequence of the display of the enhancement image to each of the confirmation objects.

In step S6, when the confirmation determination portion 75 determines that the driver executes the safety confirmation, the feedback portion 77 provides the information based on the reaction time determined by the reaction determination portion 76. In step S7, when the predetermined time elapses from the operation in S4 of the display of the enhancement image, which emphasizes the confirmation object, (i.e., YES at S7), the procedure proceeds to step S8. When the predetermined time does not elapse (i.e., NO at S7), the procedure returns to S5 and repeats the operations. The predetermined time is set to be longer than the threshold time and shorter than a limit time of which time is up.

In step S8, the feedback portion 77 provides the information (that is, warning) that controls the driver to notice the confirmation object. In step S9, similar to S5, the confirmation determination portion 75 determines whether the driver executes the safety confirmation to the confirmation object.

When the confirmation determination portion 75 determines that the driver executes the safety confirmation to the confirmation object (i.e., YES at S9), the procedure proceeds to step S6. When the confirmation determination portion 75 determines that the driver does not execute the safety confirmation to the confirmation object (i.e., NO at S9), the procedure proceeds to step S10.

In step S10, when the limit time elapses from the operation in S4 of the display of the enhancement image, which emphasizes the confirmation object, that is, the time is up (i.e., YES at S10), the procedure proceeds to step S11. When the time is not up (i.e., NO at S10), the procedure returns to S9 and repeats the operations. The limit time is set to be longer than the threshold time and shorter than a time interval at which the enhancement image is displayed in sequence.

In step S11, when the confirmation object to be determined whether the safety confirmation is executed is left in the confirmation object determined in S3 (i.e., YES at S11), the procedure returns to S4, and then the visual attraction portion 74 controls the HCU40 to execute the attractive display that guides the visual line of the driver to the next confirmation object. When each of the confirmation objects determined in S3 which is to be determined whether the safety confirmation is executed is not left (i.e., NO at S11), the procedure proceeds to step S12.

In step S12, the proficiency factor determination portion 78 determines the proficiency factor of the safety confirmation of the driver comparing the number of the confirmation object of which the confirmation determination portion 75 determines that the safety confirmation is executed with the number of the multiple confirmation objects determined by the object determination portion 72. The memory portion 79 stores the determined proficiency factor. When storing a new proficiency factor, the memory portion 79 overwrites the new proficiency factor on the old proficiency factor.

In step S13, when the drive teaching relation procedure is determined that the end time point has come (i.e., YES at S13), the drive teaching relation procedure ends. When the drive teaching relation procedure is determined that the end time point has not come (i.e., NO at S13), the procedure returns to S1. The end time point of the drive teaching relation procedure may be provided by turning off of the ignition power source of the subject vehicle.

Summary of First Embodiment

Assume that the reaction time of the safety confirmation to the attractive display that guides the visual line of the driver to the confirmation object becomes short. The configuration may praise the reaction of the driver with the attractive provision in case that it is determined that the driver executes the safety confirmation. There is a high possibility that the driver intends to react to the attractive display in order to be praised. Thus, the configuration can attract the driver into the guided safety confirmation. The configuration provides the information when determining that the driver executes the safety confirmation. With the information provision, the driver can recognizes that the driver has executed the safety confirmation to the confirmation object.

The configuration of the first embodiment executes the attractive display in decreasing order from the most prioritized confirmation object when there are the multiple confirmation objects. With this configuration, the visual line of the driver is guided in decreasing order from the most prioritized confirmation object. Thus, after repeating the guided safety confirmation, the driver can learn the confirmation object that needs to be prioritized and a safety drive operation.

The configuration determines, corresponding to the driving scene, the confirmation object of which the safety confirmation is to be executed by the driver. Thus, the configuration can determine an appropriate confirmation object for each of the driving scenes. The configuration weights the priority of the confirmation object corresponding to the driving scene. Thus, when the prioritized confirmation object differs corresponding to each of the driving scenes, the configuration can prioritize the attractive display of the prioritized confirmation object. The driver can learn the confirmation object that needs to be prioritized and a safety drive operation each of which corresponds to the driving scene.

With the configuration of the first embodiment, the attractive display is changed corresponding to the proficiency factor of the safety confirmation of the driver. The driver tries to obtain the attractive display of the higher proficiency factor, thus there is a high possibility that the driver intends to react to the attractive display. The configuration can attract the driver into the guided safety confirmation.

Second Embodiment

A configuration that the priority of the confirmation object is determined corresponding to a driver characteristic that indicates weakness of the safety confirmation for the driver (hereinafter, referred to as a second embodiment) may be employed. An exemplary configuration of the second embodiment will be described. A drive assistance system 1 of the second embodiment is similar to the drive assistance system 1 of the first embodiment except for a driving teaching device 7a. The drive assistance system 1 of the second embodiment includes the driving teaching device 7a instead of the driving teaching device 7.

Figure 7:
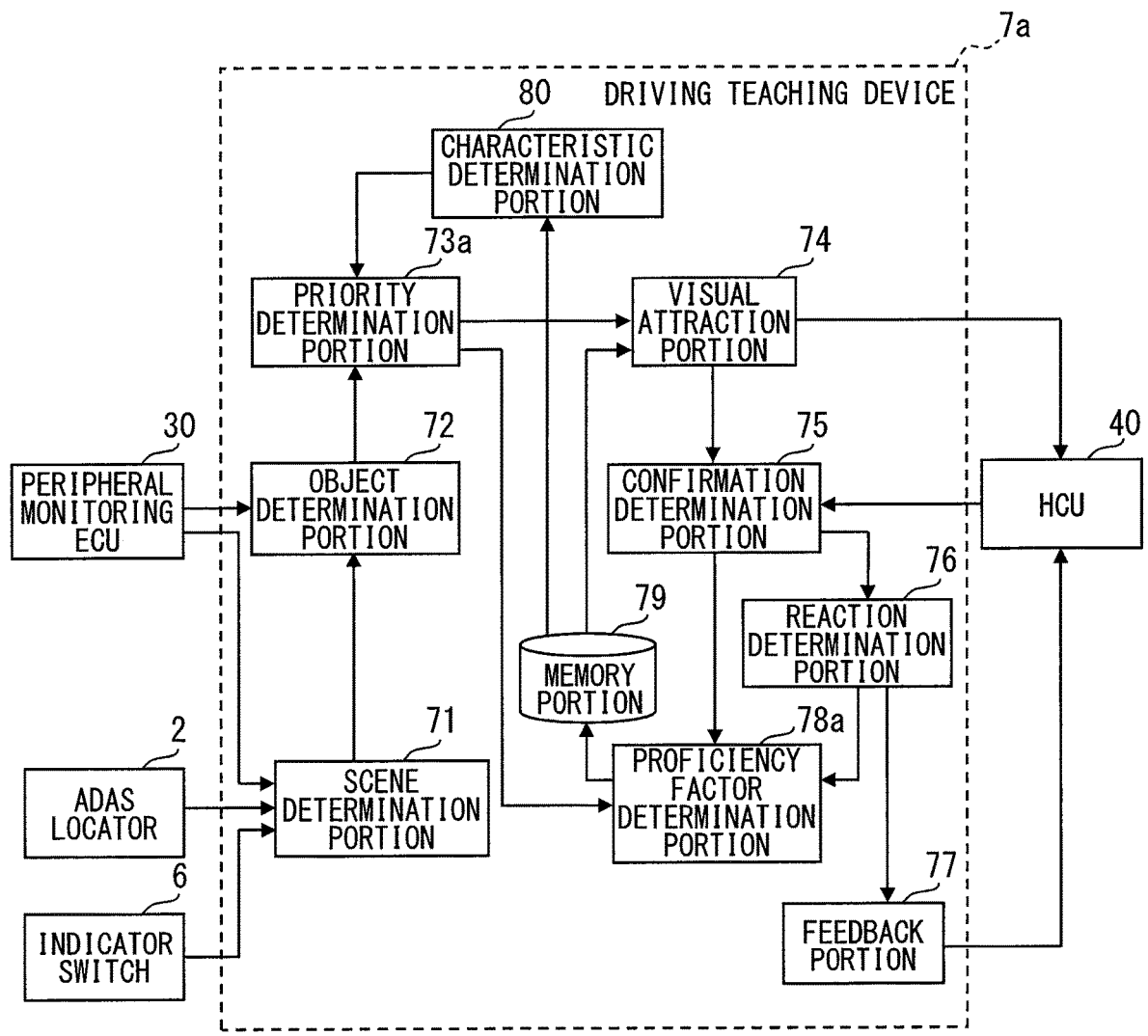
FIG. 7 is a diagram showing an exemplary configuration of driving teaching device according to a second embodiment.

A driving teaching device 7a will be described with reference to FIG. 7. The driving teaching device 7a includes the scene determination portion 71, the object determination portion 72, a priority determination portion 73a, the visual attraction portion 74, the confirmation determination portion 75, the reaction determination portion 76, the feedback portion 77, the proficiency factor determination portion 78a, the memory portion 79, and a characteristic determination portion 80. The driving teaching device 7a is similar to the driving teaching device 7 of the first embodiment except for the priority determination portion 73a, the proficiency factor determination portion 78a, and the characteristic determination portion 80. The priority determination portion 73a replaces the priority determination portion 73. The proficiency factor determination portion 78 is replaced with the proficiency factor determination portion 78a.

The proficiency factor determination portion 78a stores, as a record history of the safety confirmation of the driver, presence or absence of the safety confirmation execution to each of the confirmation objects in a driving scene to the memory portion 79. The record history of the safety confirmation of the driver is stored by each of the driving scenes. The proficiency factor determination portion 78a is similar to the proficiency factor determination portion 78 of the first embodiment except for the configuration.

The characteristic determination portion 80 determines the driver characteristic that indicates the weakness of the safety confirmation for the driver based on the presence or absence of the safety confirmation execution to each of the confirmation objects for each of the driving scene, which stored in the memory portion 79. For example, the confirmation object of which the ratio of the absence of the safety confirmation execution to the presence of the safety confirmation execution is high is determined to be the weak confirmation object of the driver.

The characteristic determination portion 80 may determines the driver characteristic based on the reaction time for each of the confirmation objects instead for the presence or absence of the safety confirmation execution to each of the confirmation objects. For example, the confirmation object that takes a long average reaction time may be determined to be the weak confirmation object of the driver. The presence or absence of the safety confirmation execution and the reaction time may be employed to determine the driver characteristic.

The priority determination portion 73a employs the driver characteristic determined by the characteristic determination portion 80 when the priority of the confirmation object is determined. The priority determination portion 73a is similar to the priority determination portion 73 except for the configuration. The priority determination portion 73a sets the higher priority weight to the weak confirmation object of the driver based on the driver characteristic determined by the characteristic determination portion 80. With this configuration, the higher priority is likely to be determined to the weaker confirmation object of the driver.

With the configuration of the second embodiment, the higher priority is likely to be determined to the weaker confirmation object of the driver. Thus, the attractive display is executed to the weaker confirmation object of the driver with priority. The configuration can prevent the driver from forgetting to execute the safety confirmation to the weak confirmation object. The attractive display is executed to the weaker confirmation object of the driver with priority. Thus, the configuration can enhance awareness of the safety confirmation to the weak confirmation object of the driver, and help overcoming the weak confirmation object.

First Modification

The above-described embodiments show a feature for determining, but are not limited to, the priority of the confirmation object corresponding to types of the driving scenes. The higher priority may be set to, instead of the types of the driving scenes, the confirmation object assumed to be close to the subject vehicle in sequence.

Second Modification

The above-described embodiments show a feature for employing, but are not limited to, the reaction time as the reaction degree of the driver to the attractive display. A proportion of the confirmation object in which the safety confirmation execution is determined by the confirmation determination portion 75 to the multiple confirmation objects determined by the object determination portion 72 may be employed as the reaction degree of the driver. In this case, the information based on the reaction degree of the driver is provided after the safety confirmation determination for all of multiple confirmation objects determined by the object determination portion 72 are completed.

Third Modification

The above-described embodiments show a feature for determining, is not limited to, the proficiency factor of the safety confirmation of the driver using the number of the confirmation objects, of which the confirmation determination portion 75 determines that the safety confirmation is executed, among the number of the multiple confirmation objects determined by the object determination portion 72. The high proficiency factor may be determined with a short average reaction time, which is determined by the reaction determination portion 76, to the multiple confirmation objects determined by the object determination portion 72.

Fourth Modification

The proficiency factor of the each of the drivers may be stored in the memory portion 79. Display of the enhancement image may be changed in accordance with the proficiency factor of the each of the drivers. Priority weighting to the confirmation object may be executed in accordance with the proficiency factor of the each of the drivers. Each of the drivers may be determined by a personal identification using the DSM 41, an ID of the electronic key of the driver.

Fifth Modification

The above-described embodiments show a feature for changing, is not limited to, the enhancement image corresponding to the proficiency factor of the safety confirmation of the driver determined by the proficiency factor determination portion 78 when the attractive display is executed. The proficiency factor determination portion 78 may not be included, and the enhancement image corresponding to the proficiency factor of the safety confirmation of the driver may not change.

Sixth Modification

A part of or all of functions of the driving teaching device 7, 7a may be covered by the vehicle control ECU 5, the peripheral monitoring ECU 30, The HCU 40, or the like.

The above-described embodiments and modifications are examples of the present disclosure. The technical ideas of the present disclosure may be achieved as various types of the embodiments. With combining elements disclosed in the embodiment or the modification with one another, the embodiment may be within the spirit and scope of the disclosure.

What is claimed is:

1. A driving teaching device for a vehicle comprising:
   a visual attraction portion configured to guide, as an attractive display, a visual line of a driver to a confirmation object to which a safety confirmation is to be executed by the driver; and
   a confirmation determination portion configured to determine whether the driver executes the safety confirmation to the confirmation object,
   the driving teaching device further comprising:
      a reaction determination portion configured to determine a reaction degree of the driver to the attractive display; and
      a feedback portion configured to provide information based on the reaction degree determined by the reaction determination portion when the confirmation determination portion determines that the driver executes the safety confirmation to the confirmation object,
   wherein the reaction determination portion determines a reaction time as the reaction degree,
   wherein the reaction time is defined from a time point at which the visual attraction portion guides, as the attractive display, the visual line of the driver to the confirmation object to which the safety confirmation is to be executed by the driver to a time point at which the confirmation determination portion determines that the driver executes the safety confirmation to the confirmation object, and wherein the feedback portion praises the driver more as the reaction time becomes shorter.

2. The driving teaching device according to claim 1, further comprising:

a priority determination portion configured to determine a priority of a plurality of confirmation objects when the plurality of confirmation objects exist, wherein the visual attraction portion, as the attractive display, guides the visual line of the driver to the plurality of confirmation objects in a decreasing order of the priority of the plurality of confirmation objects.

3. The driving teaching device according to claim 2, further comprising:

a scene determination portion configured to determine whether the driver drives the vehicle in a driving scene that needs the safety confirmation; and an object determination portion configured to determine the confirmation object according to the driving scene when the scene determination portion determines that the driver drives the vehicle in the driving scene that needs the safety confirmation, wherein the visual attraction portion guides, as the attractive display, the visual line of the driver to the confirmation object determined by the object determination portion.

4. The driving teaching device according to claim 3, wherein the driving scene is classified into a plurality of types, and the priority determination portion determines the priority of the plurality of confirmation objects according to the plurality of types of the driving scene when the plurality of confirmation objects exist.

5. The driving teaching device according to claim 2, further comprising:

a characteristic determination portion configured to determine a driver characteristic indicative of weakness of the safety confirmation for the driver based on a record history of a determination result, which is executed by the confirmation determination portion and indicates whether the driver executes the safety confirmation to the confirmation object, wherein the priority determination portion determines the priority of the plurality of confirmation objects according to the driver characteristic determined by the characteristic determination portion when the plurality of confirmation objects exist.

6. The driving teaching device according to claim 2, further comprising:

a proficiency factor determination portion configured to determine a proficiency factor of the safety confirmation of the driver using a total number of the plurality of confirmation objects, of which the confirmation determination portion determines that the driver executes the safety confirmation, among all of the plurality of confirmation objects when the plurality of confirmation objects exist.

7. The driving teaching device according to claim 6, wherein the proficiency factor determination portion determines the proficiency factor by setting a higher priority weight to the confirmation object that has a higher priority determined by the priority determination portion.

8. The driving teaching device according to claim 1, further comprising:

a proficiency factor determination portion configured to determine a proficiency factor of the safety confirmation of the driver using the reaction degree of the driver determined by the reaction determination portion.

9. The driving teaching device according to claim 6, wherein the visual attraction portion changes a feature of the attractive display corresponding to the proficiency factor determined by the proficiency factor determination portion.

10. The driving teaching device according to claim 1, wherein the feedback portion praises the driver by showing an attractive display.

11. The driving teaching device according to claim 10, wherein the attractive display is superimposed on a position of a confirmation object on a screen.

* * * * *